Jan. 19, 1932.                H. BAUM                 1,841,930
          ELECTRICAL APPARATUS AND METHOD OF MAKING THE SAME
                    Filed Sept. 8, 1925       2 Sheets-Sheet 1
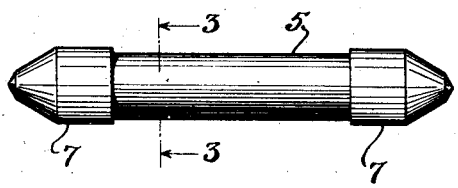
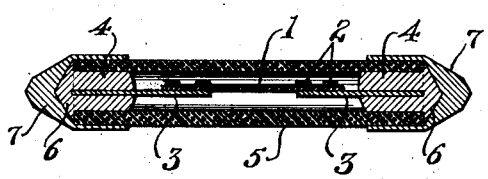
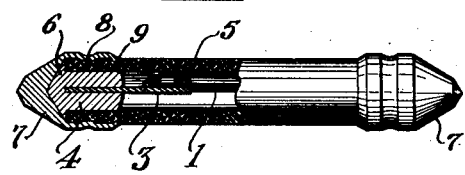
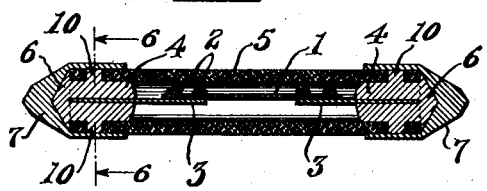
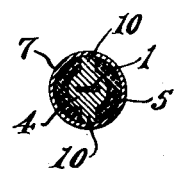
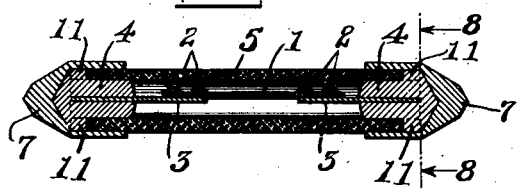
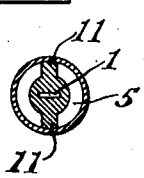
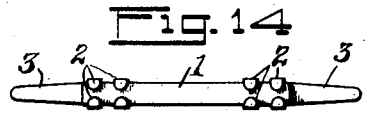
INVENTOR
Harry Baum
BY
Schechter Lotsch
his ATTORNEYS Jan. 19, 1932.   H. BAUM   1,841,930
ELECTRICAL APPARATUS AND METHOD OF MAKING THE SAME
Filed Sept. 8, 1925   2 Sheets-Sheet 2
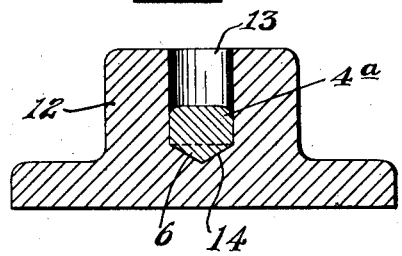
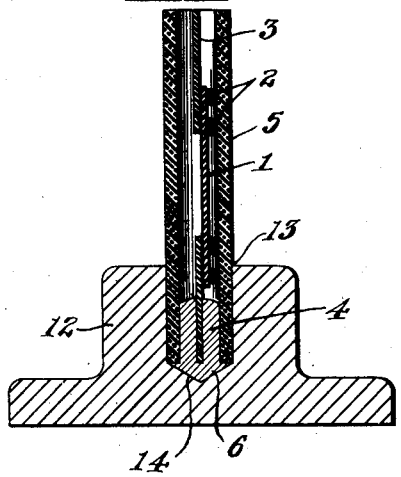
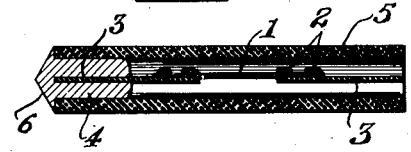
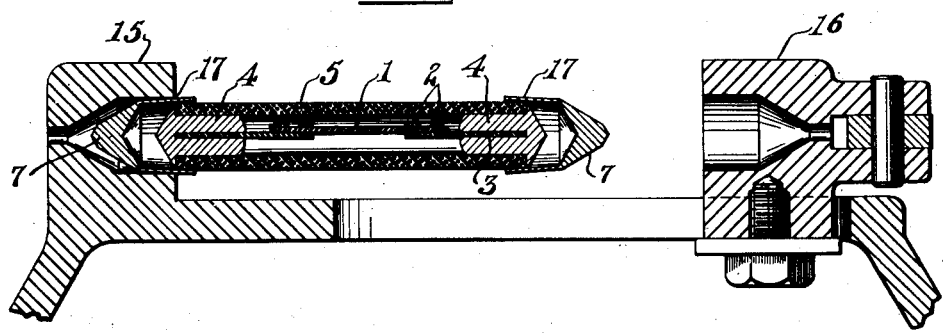
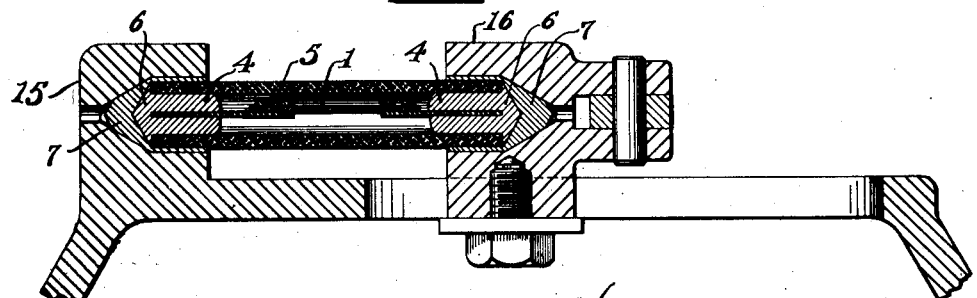

Patented Jan. 19, 1932

1,841,930

UNITED STATES PATENT OFFICE

HARRY BAUM, OF NEW YORK, N. Y., ASSIGNOR TO POLYMET MANUFACTURING CORPORATION, A CORPORATION OF NEW YORK

ELECTRICAL APPARATUS AND METHOD OF MAKING THE SAME

Application filed September 8, 1925. Serial No. 54,870.

The present invention relates generally to resistors or grid leaks adapted for use in the radio art, and more particularly to improvements in the construction of such resistors or grid leaks and in the method of manufacturing and producing such devices.

One of the objects of my invention is to provide a simple compact grid leak or resistor in which the resistance element is securely positioned, free from contact with any surface, excepting the end supporting members.

Another object of my invention is to support the resistance element within an air tight chamber, so as to be free from moisture and disturbing atmospheric conditions which would have a serious detrimental effect on the quality of radio reception.

A further object is to provide a grid leak or resistor of such simple, sturdy and rugged construction that it will successfully resist rough handling, accidental dropping and the like, without harm.

A further object is to provide a simple device which readily lends itself to quantity or mass production with consequent economies of manufacture.

A further object of my invention is the method of manufacturing such grid leaks or resistors.

With these and other objects in view, to be more fully set forth hereinafter, the invention consists in the novel construction, combination of elements and arrangement of parts which will be exemplified in the operation and construction herein described in the following specification and illustrated in the accompanying drawings:

The invention will first be described in connection with the accompanying drawings, wherein similar reference characters are used to designate corresponding parts throughout the several views, and more specifically defined and indicated in the appended claims.

Attention is directed to the drawings in which:—

Fig. 1 is a side view of a grid leak or resistor embodying my invention,

Fig. 2 is a central sectional elevation,

Fig. 3 is a cross sectional elevation taken on the line 3—3 of Fig. 1,

Fig. 4 is a side view partly in section of a modified mounting of the end caps,

Fig. 5 is a central sectional elevation of a further modification of my invention, Fig. 6 is cross sectional view taken on the line 6—6 of Fig. 5, Fig. 7 is a central sectional elevation of another modification of my invention, Fig. 8 is a cross sectional view taken on the line 8—8 of Fig. 7, Fig. 9 is a central sectional elevation of an assembling die used in the manufacture of the grid leak or resistor, Fig. 10 is a central sectional elevation of an assembling die, with one step of the assembling operation completed, Fig. 11 is a central sectional elevation of my improved grid leak or resistor after the completion of the first step in the assembling operation, Fig. 12 is a central sectional view of my grid leak or resistor in a capping machine preparatory to performing the capping operation, Fig. 13 is a central sectional view of my grid leak or resistor after the completion of the capping operation, and Fig. 14 is a plan view of the resistance element with its supporting terminals.

A strip 1, or the like, of suitable resistance material such as carbon impregnated paper, designed to offer the proper megohms of resistance, is lightly held at its ends by the bent over fingers 2 made integral with the metallic terminal supporting and current conducting members 3, Fig. 14, which are embedded in the terminal plugs 4 (Fig. 2) in such a way as to maintain the resistance strip 1 in position. The terminal plugs 4 are of suitable current conducting metal, with a low melting point such as "Wood's metal", and is put in position in a molten state and formed as will be more fully described hereinafter. The tube 5 is of suitable insulating material such as hard rubber, fiber, wood, bakelite or the like. The enlarged heads 6 of the terminal plugs 4 extending outside tube 5 afford a broad surface for good electrical contact with the metal caps 7, which are forced over the ends of the tube 5.

Referring to the modification as illustrated in Fig. 4, the caps 7 on the ends of the tube 5 have been crimped or rolled into annular depressions as at 8 and 9 which may be machined or molded in the ends of said tube. The purpose of this is to securely lock the caps in position thereby preventing the possibility of breaking the electrical contact between the terminal plugs 4 and said caps, as will be readily understood.

In the modification illustrated in Figs. 5 and 6, I show another improvement to securely hold the terminal plugs 4 with respect to tube 5, and in order to prevent any lateral or rotating movement thereof, which would damage the resistance element in which the opening or holes 10 may be provided in tube 5 into which the molten "Wood's metal", forming the terminal plugs, may flow to form lugs on the plugs. The same results may be accomplished by slotting the ends of tube 5 as at 11 as illustrated in Figs. 7 and 8.

In assembling my improved grid leak or resistor I employ an assembling mould 12 provided with a central recess 13 terminating in head forming depression 14. The recess 13 being of a size to conveniently admit, with a sliding fit, the tube 5. A suitable quantity of molten "Wood's metal" 4ª having been placed in the bottom of recess 13, Fig. 9, a tube 5, with a resistance element in an approximately central position therein, Fig. 10, is introduced into the recess and forced home. This causes the molten "Wood's metal" to flow upward within the tube, thereby surrounding the terminal 3. At this time an oscillating movement is given the tube 5, the object of which is to prevent the "Wood's metal" from adhering to the head forming depression 14, and thus when cool the terminal plug 4, with head 6 is formed, see Fig. 11, with one end of the resistance element positioned approximately centrally within the tube. The same operation may then be repeated to form the terminal plug in the other open end of the tube, as will be readily understood.

In Figs. 12 and 13 is illustrated a capping machine in which a stationary capping die 15 with a bore of uniform diameter may be used, and cooperating therewith is a movable capping die member 16 also having a bore of uniform diameter. The caps 7, Fig. 12, having slightly flared portions 17, may be manually placed on each end of the tube 5, which is then inserted and held in position in capping die 15, so that when the movable capping die 16 is forced to the left as in Fig. 13, the caps will be driven home to form a good electrical contact with terminal plug heads 6, and at the same time the straight bores of the capping dies 15 and 16 will produce a certain crimping or squeezing effect on the flared portions 17 of the caps 7, to insure a very snug and positive fit with tube 5.

In accordance with the provisions of the patent statute, I have described my invention together with the construction which I now consider to represent the best embodiment thereof, but I desire it understood that my invention is not confined to the particular form shown and described, the same being merely illustrative, and that the invention can be carried out in other ways without departing from the spirit of my invention, and therefore, I claim broadly the right to employ all equivalent instrumentalities coming within the scope of the appended claims, and by means of which objects of my invention are attained, and new results accomplished, as herein set forth, as it is obvious that the particular embodiments herein shown and described are only some of many that can be employed to attain these objects and accomplish these results.

Having now described my invention, what I claim and desire to secure by Letters Patent, is:—

1. In a device of the character described comprising a casing, a resistance element within said casing, supporting members for said resistance element, closure plugs adapted to retain said supporting members in position and supported within said casing, a sealing cap received externally of said casing member, and means for preventing longitudinal movement between said casing member and said sealing cap, said supporting members comprising centrally positioned longitudinally extending strips having resistance element engaging fingers at their inward terminals.

2. The method of forming a device of the character described, which includes associating a resistance element with a pair of longitudinally extending supporting elements, positioning said associated resistance element and supporting elements within a tubular casing, molding within said casing closure plugs, which embed the extremities of the supporting elements, and forcing upon the extremities of said casing closure caps.

3. In an electrical device of the character described, in combination, a central resistance element, metallic terminal supporting and current conducting members, said central resistance element being lightly held at its end by bent-over fingers made integral with the metallic terminal supporting and current conducting members, terminal plugs supporting said element, an insulated tube surrounding said element and a cap sealing said members within said tube.

This specification signed this 18th day of August, 1925.

HARRY BAUM.